March 6, 1934.   R. T. STAPLES   1,950,126
CABLE CONDUCTOR WINDING
Filed Sept. 30, 1931

INVENTOR
R. T. STAPLES
BY
ATTORNEY

Patented Mar. 6, 1934

1,950,126

UNITED STATES PATENT OFFICE 1,950,126

CABLE CONDUCTOR WINDING

Robert T. Staples, Westfield, N. J., assignor to Bell Telephone Laboratories, Incorporated, New York, N. Y., a corporation of New York Application September 30, 1931, Serial No. 565,963

6 Claims. (Cl. 173—264)

This invention relates to yarn windings used to insulate, protect, and identify wire conductors, particularly conductors contained in switchboard cables.

The object of this invention is to provide a simple and inexpensive means of identification to be applied to conductors in a cable in order that differentiation between them may be done quickly and accurately.

Attainment of this objective is accomplished by the use of a so-called novelty yarn which substitutes for the solid colored threads now in use a two-ply thread consisting of the combination of one ply having a solid color and the other ply having a different solid color which presents a sharp contrast with the first color, the two plies being twisted about each other so as to imitate the spiral stripes on a barber's pole. When at least two threads of novelty yarn lie beside each other, the spiral stripes of each thread combine with those of the other thread and present a peculiar appearance which might be described by the adjectives checkered, speckled, mottled, and striated. Since none of these four adjectives exactly describes this peculiar appearance the term "mottled" will be used for the sake of simplicity and uniformity. When this novelty yarn is used in combination with the present type of yarn now in use, the contrast between the solid colors and the mottled colors is very outstanding and distinctive, thereby immensely facilitating identification of cable conductors.

Elucidation of this invention may best be obtained by describing the manner in which it may be used to identify switchboard cable conductors and by referring to the drawing in which.

Figure 1:
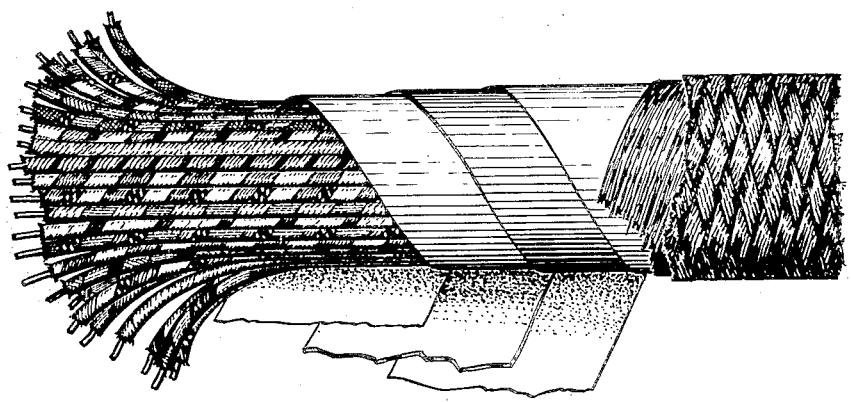
Fig. 1 represents a switchboard cable.

Fig. 1 shows a partly stripped section of a switchboard cable and is almost self-explanatory as it shows that each conductor is individually protected by several layers of insulating material. Likewise, this figure shows how the insulated conductors are grouped together into a cable by winding more protective wrappings about them as a whole, all of which are held in place by the outside protective wrappings which are braided in order to reduce raveling.

In order to more fully appreciate the importance of this invention, it is desirable to consider briefly some of the details pertaining to the development of quadded switchboard cable. This type of cable is used for general cabling in toll offices and forms a connection between a lead covered entrance cable and a distribution frame and then passes to a switchboard. It also interconnects other apparatus in central offices. The necessity for distinguishing between the conductors contained in one of these cables becomes apparent upon understanding that it is necessary for them to be installed properly and occasionally removed and reinstalled elsewhere. In this connection it is significant to note that installation trouble caused by wrong connections is expensive and delays completion of the installation.

The quadded cables formerly used had distinctive colors on only one conductor of each pair of a quad, the other two conductors having plain colors. With these cables no trouble was experienced from the conductors becoming untwisted during the processes of forming and installing because the impregnating wax which was used held the wires twisted together. Therefore, the plain colored conductors depended upon the distinctively colored conductors, with which they were paired, for their identity.

However, with the introduction of the cellulose acetate treated conductors, which are much springier than the conductors formerly used, the impregnating wax was omitted for engineering reasons. It was then found that the plain colored conductors would become untwisted from their distinctively colored mates. Consequently, this led to the use of identifying color bands on each and every conductor in a cable. When this was attempted, it was found that some of the marking bands were hard to distinguish due principally to the fact that there were four relatively narrow color groups in the marking bands, thus causing much difficulty in differentiating between a plurality of colors, particularly the dark colors. Since approximately 40% of the color combinations used comprised a plurality of dark colors, the need for a contrasting color scheme was imperative. Brighter and more contrasting colors were then made available and used in further experimentation. This remedied the situation somewhat, but not to a satisfactory degree. Then the combined use of novelty yarn with the newer and brighter colors was suggested. It now appears to be the most desirable method of identification, especially since this yarn is not much more expensive to manufacture than the yarn now in use as it presents no manufacturing difficulties.

Figure 2:
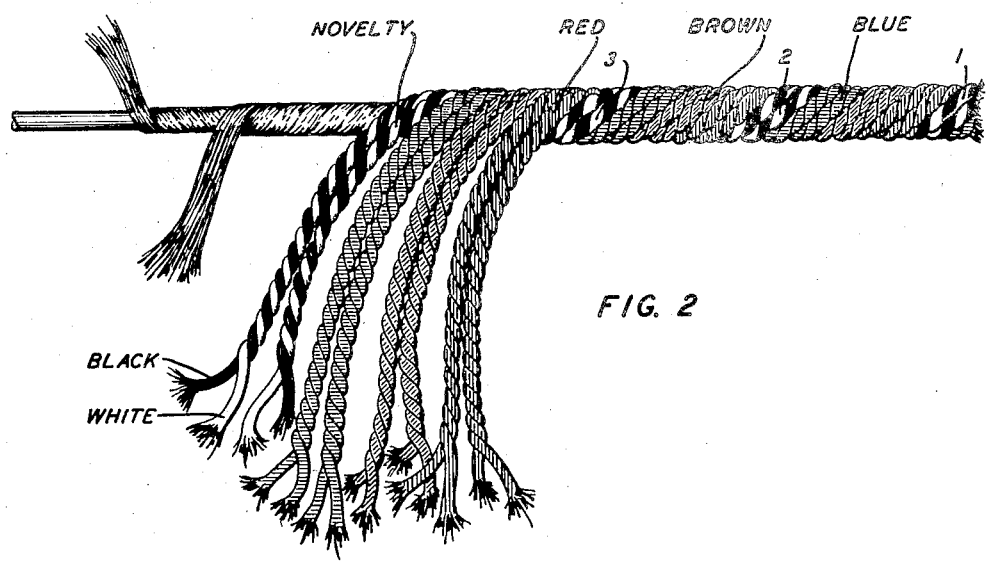
Fig. 2 depicts the novelty yarn applied to one conductor, considerably magnified, of the switchboard cable shown in Fig. 1.

The manner in which the novelty yarn is used may best be understood by referring to Fig. 2 which shows a partly stripped portion of one conductor. It will be noted that the conducting wire is already protected by two windings before the color band is wrapped around it. This color band usually consists of eight two-ply threads thereby making a total of sixteen strands. Of course, it is to be understood that this invention is not to be limited to this number which, together with the following details, simply sets forth, purely for expository reasons, one of the ways in which the invention may be applied. For purposes of illustration, the band is shown to consist of four color groups, one of which is formed by the novelty yarn, thus permitting the use of five colors. Each color group is shown to consist of two threads placed side by side so as not to twine around each other.

As has been stated above, the novelty yarn is a mixture of two colors and is formed by a two-ply thread, one strand having one color and the other strand having a sharply contrasting color, the two strands being twisted about each other so that they present spiral stripes of the barber's pole type. In Fig. 2, the two colors used in the novelty yarn are shown to be black and white, but red and white or any such combination would be just as efficacious. Since the two threads of a color group lie side by side without crossing over each other, it follows that, in the group composed of the novelty yarn, sometimes a strand in one thread will lie beside another strand of the same color but in an adjoining thread. In this case, the two threads will present a striped appearance as at 1. If two neighboring strands are of different colors, they will present a checkered appearance as at 2. Likewise, when the strands are slightly out of phase the two threads will appear to be mottled or speckled as at 3. For the sake of simplicity and uniformity, the adjective mottled will be used as generic to all of these effects in describing the appearance of this yarn in the claims.

The use of novelty yarn will shorten the time required by workmen to identify cable conductors during installation and maintenance. When the large number of these cables now in use is considered, it can be appreciated that this invention effects a substantial reduction in overhead costs.

The spirit of this invention may be embodied by threads composed of more than two strands, by color groups having a different number of threads, by bands having a different number of color groups, and by bands consisting of a different number of threads.

The application of this invention is not confined to switchboard cables, but may be applied to other types of cables; nor is it confined to cable conductors as it may be used wherever identification marking of this type is needed. Groups of colored wires, instead of threads, twisted about each other would serve equally well for purely identification purposes. In short, the scope of this invention is to be limited only by the following claims.

What is claimed is:

1. A variegated identification band comprising threads of stranded material, at least two of the threads comprising at least two strands of different colors, said strands being twisted about each other so as to form a thread having spiral stripes, said identification band having at least two of these spiral striped colored threads lying side by side so that the spiral stripes of each thread combine with the spiral stripes of the other thread thereby presenting a peculiar mottled appearance.

2. A multi-conductor cable having various conductors distinguished from other conductors by means of variegated identification bands of stranded material constructed in accordance with claim 1.

3. A multi-conductor cable in which some of the conductors are insulated with a covering comprising wrappings of textile yarns of several colors, each color forming a spiral band in an insulating covering, and having at least one of the yarns in the insulating coverings of some of the conductors being a twisted yarn made from at least two solid colored yarn strands which have strongly contrasting colors and which are twisted into one thread thereby producing a band having a mottled color which is readily distinguishable from an adjacent band having a color from which one of the said contrasting colors was not readily distinguishable.

4. A multi-conductor cable having marking means for identifying some of the conductors in the cable from some of the other conductors in the cable, said marking means comprising a covering for a conductor, said covering comprising wrappings of insulating material which is colored in combinations of colors individually distinctive for a conductor, and identifying means for readily distinguishing a certain color, such as red, from another color of closely similar appearance, such as orange, in the same covering for the same conductor, said identifying means comprising a contrasting mottling introduced into the certain color.

5. A multi-conductor cable in which some of the conductors are insulated with a covering comprising wrappings of textile yarns of several colors, each color forming a spiral band in an insulating covering, and identifying means for readily distinguishing black colored yarn wrappings when they are adjacent to other colored wrappings of closely similar appearance, such as blue, said identifying means comprising the modification of the color black to a contrasting black and white mottled color.

6. A multi-conductor cable in which some of the conductors are insulated with a covering comprising wrappings of textile yarns of several colors, each color forming a spiral band in an insulating covering, and identifying means for readily distinguishing red colored yarn wrappings when they are adjacent to other colored wrappings of closely similar appearance, such as orange, said identifying means comprising the modification of the color red to a contrasting red and white mottled color.

ROBERT T. STAPLES.